US012623851B2

(12) United States Patent (10) Patent No.: US 12,623,851 B2
Yamamoto et al. (45) Date of Patent: May 12, 2026

(54) MOTORIZED CONVEYOR ROLLER AND CONVEYOR DEVICE

(71) Applicant: KYOWA MANUFACTURING CO., LTD., Hyogo (JP)

(72) Inventors: Shinya Yamamoto, Hyogo (JP); Yusuke Saegusa, Hyogo (JP)

(73) Assignee: KYOWA MANUFACTURING CO., LTD., Hyogo (JP)

( * ) Notice: Subject to any disclaimer, the term of this patent is extended or adjusted under 35 U.S.C. 154(b) by 275 days.

(21) Appl. No.: 18/705,664

(22) PCT Filed: Apr. 24, 2023

(86) PCT No.: PCT/JP2023/016080
§ 371 (c)(1),
(2) Date: Apr. 29, 2024

(87) PCT Pub. No.: WO2024/089914
PCT Pub. Date: May 2, 2024

(65) Prior Publication Data
US 2026/0125220 A1      May 7, 2026

(30) Foreign Application Priority Data

Oct. 25, 2022      (JP) ................................. 2022-170747

(51) Int. Cl.
B65G 23/08          (2006.01)
B65G 13/07          (2006.01)
B65G 43/02          (2006.01)
(52) U.S. Cl.
CPC ............. B65G 23/08 (2013.01); B65G 13/07 (2013.01); B65G 43/02 (2013.01)

(58) Field of Classification Search
CPC ......... B65G 23/08; B65G 13/07; B65G 43/02
See application file for complete search history.

(56) References Cited

U.S. PATENT DOCUMENTS 6,125,993 A * 10/2000 Hansson ................ B65G 23/08
198/788
7,299,915 B2 * 11/2007 El-Ibiary ................ B65G 23/08
198/791
(Continued)

FOREIGN PATENT DOCUMENTS

DE          35 30 034 A1      2/1987
DE      10 2006 049 327 A1      4/2008
(Continued)

OTHER PUBLICATIONS

International Search Report issued in PCT/JP2023/016080; mailed Jul. 18, 2023.
(Continued)

*Primary Examiner* — Mark A Deuble
(74) *Attorney, Agent, or Firm* — Studebaker Brackett PLLC

(57) ABSTRACT

A motorized conveyor roller according to the present invention includes: a pair of support shafts that rotatably support a roller tube; a motor and a drive circuit therefor each located in the roller tube; and a heat conducting part that conducts heat from the drive circuit to one of the pair of support shafts. A conveyor device according to the present invention includes one or more of the motorized conveyor rollers.

10 Claims, 7 Drawing Sheets

(56) References Cited

U.S. PATENT DOCUMENTS

| | | | | |
|---|---|---|---|---|
| 7,329,215 | B2 * | 2/2008 | Umeda | F16H 57/0415 |
| | | | | 492/46 |
| 7,987,970 | B2 * | 8/2011 | Schwesig | H02K 9/223 |
| | | | | 198/788 |
| 8,381,901 | B2 * | 2/2013 | Yamamoto | B65G 23/08 |
| | | | | 198/791 |
| 9,004,263 | B2 * | 4/2015 | Hall | B65G 43/00 |
| | | | | 198/794 |
| 10,093,487 | B2 * | 10/2018 | Ramezani | H02K 1/02 |
| 11,091,321 | B2 * | 8/2021 | Dorok | B65G 39/02 |
| 2002/0060104 | A1 * | 5/2002 | Nakazawa | B62D 5/30 |
| | | | | 180/433 |
| 2002/0060140 | A1 | 5/2002 | Nakamura et al. | |
| 2006/0049702 | A1 | 3/2006 | Hvidberg | |
| 2007/0114861 | A1 | 5/2007 | Bott et al. | |
| 2009/0166157 | A1 | 7/2009 | Kratz et al. | |
| 2011/0062000 | A1 | 3/2011 | Yamamoto | |
| 2015/0068873 | A1 * | 3/2015 | Wallace | B65G 13/07 |
| | | | | 198/790 |
| 2016/0257496 | A1 | 9/2016 | Ruggeri | |
| 2020/0270065 | A1 * | 8/2020 | Dorok | B65G 39/07 |

FOREIGN PATENT DOCUMENTS

| | | | | |
|---|---|---|---|---|
| EP | 3034437 | A1 * | 6/2016 | ............. B65G 13/06 |
| ES | 2 285 198 | T3 | 11/2007 | |
| JP | 3600860 | B2 | 12/2004 | |
| JP | 2009-509890 | A | 3/2009 | |
| JP | 2014-068501 | A | 4/2014 | |
| JP | 2018-177441 | A | 11/2018 | |

OTHER PUBLICATIONS

Extended European Search Report issued in EP 23 87 8360.9-1017 by the European Patent Office on Feb. 13, 2025, which is related to U.S. Appl. No. 18/705,664.

Valentini et al.; "Synergistic effect of graphite nanoplatelets and carbon black in multifunctional EPDM nanocomposites"; Aug. 21, 2015; pp. 1-20; XP093246606; DOI: 10.48550/arXiv.1508.06902; Retrieved from the Internet: URL: https://arxiv.org/pdf/1508.06902.

* cited by examiner

FIG.4A
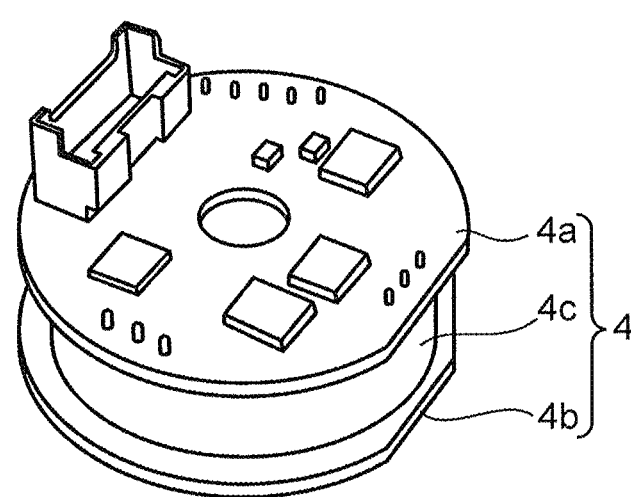
FIG.4B
FIG.4C
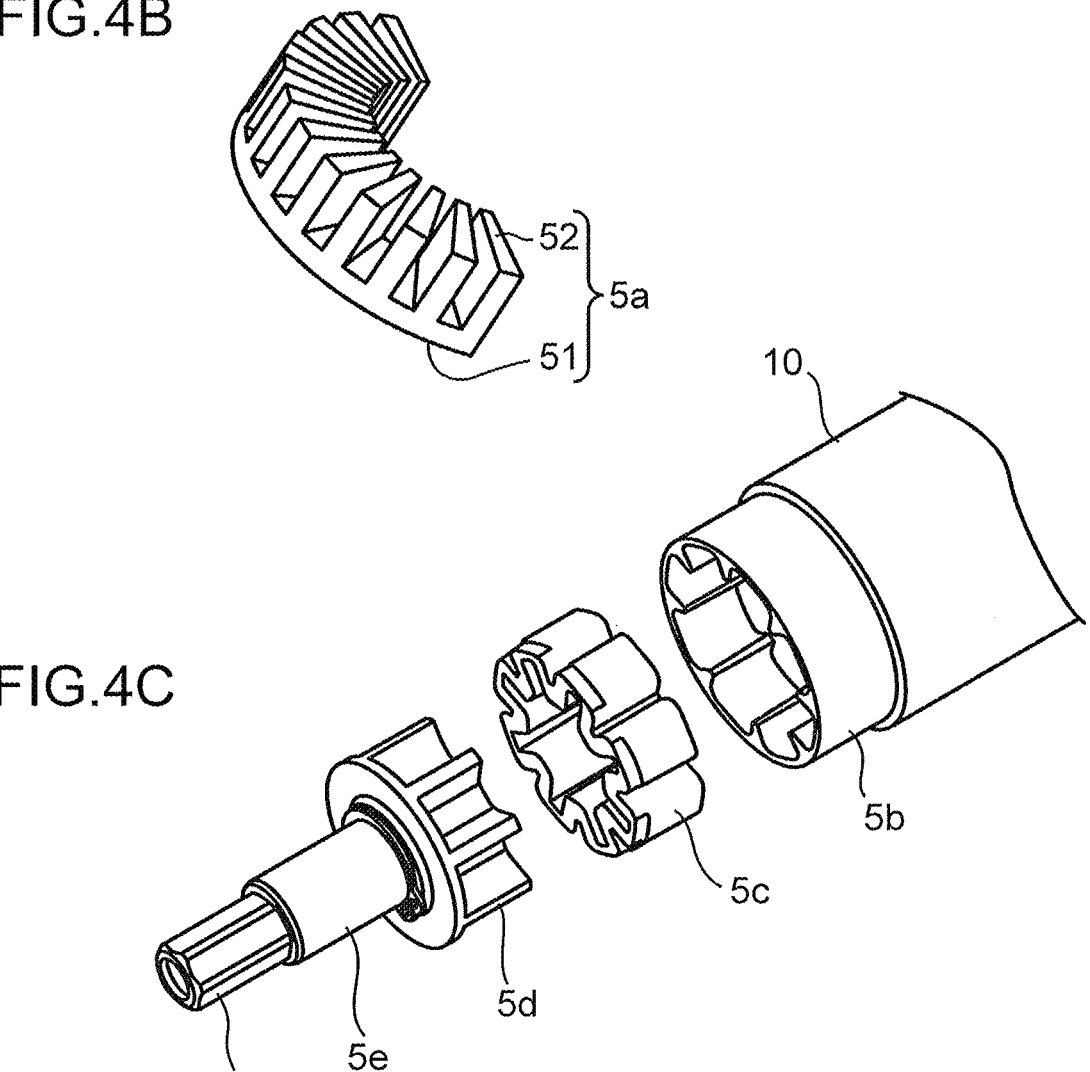

MOTORIZED CONVEYOR ROLLER AND CONVEYOR DEVICE

TECHNICAL FIELD

The present invention relates to a motorized conveyor roller for use in a conveyor device, and a conveyor device using the motorized conveyor roller.

BACKGROUND ART

Conveyor devices have been widely used to transfer target objects on, for example, production sites and distribution sites. The conveyor devices are broadly classified into roller conveyor devices and belt conveyor devices. Such a roller conveyor device includes a plurality of rollers juxtaposed in a direction to transfer or convey a target object or conveyed object on a transfer passage or conveyance passage defined by the rollers. Such a belt conveyor device includes a plurality of rollers juxtaposed in a direction and a conveyance belt resting on the rollers to transfer a target object on a transfer passage defined by the conveyance belt. Each of the rollers in each of the roller conveyor device and the belt conveyor device is provided with a motor therein, and the rollers include a motorized roller (driving roller) that rotates with a drive force generated by the motor and a roller (driven roller) that rotates along with the rotation of the motorized roller via, for example, the resting belt and the target object. The motor in the motorized roller is driven by a motor driving device (motor control device) attached to an external part of the motorized roller, e.g., a conveyor frame member (see Patent Literature 1 and Patent Literature 2).

Incorporation of the motor driving device (motor control device) into the motorized roller simplifies the conveyor device. However, the temperature of the motorized roller increases along with an increase in the temperature of coils in the motor due to drive by the roller. The incorporation of the motor driving device causes a further temperature increase accompanied by an increase in a temperature of an element, e.g., a MOSFET, constituting the motor driving device. In a case where the motor driving device includes a protection circuit against such a temperature increase, the protection circuit may be activated, and the activation may hinder the motor driving device from driving the motor. Besides, the temperature increase is unpreferable in the roller conveyor device for a target object to be placed on the roller.

CITATION LIST

Patent Literature

Patent Literature 1: Japanese Unexamined Patent Publication No. 2014-068501
Patent Literature 2: Japanese Unexamined Patent Publication No. 2018-177441

SUMMARY OF INVENTION

The present invention has been accomplished in consideration of the above-described circumstances, and has an object of providing a motorized conveyor roller and a conveyor device each for a reduction in a temperature increase.

A motorized conveyor roller according to the present invention includes: a pair of support shafts that rotatably support a roller tube; a motor and a drive circuit therefor each located in the roller tube; and a heat conducting part that conducts heat from the drive circuit to one of the pair of support shafts. The conveyor device according to the present invention includes one or more of the motorized conveyor rollers.

The foregoing, and the object, features, and advantages of the present invention will be further clarified by the following detailed description and the accompanying drawings.

BRIEF DESCRIPTION OF DRAWINGS

FIG. 4 includes explanatory views of main components of the motorized conveyor roller.

DESCRIPTION OF EMBODIMENTS

Figure 1:
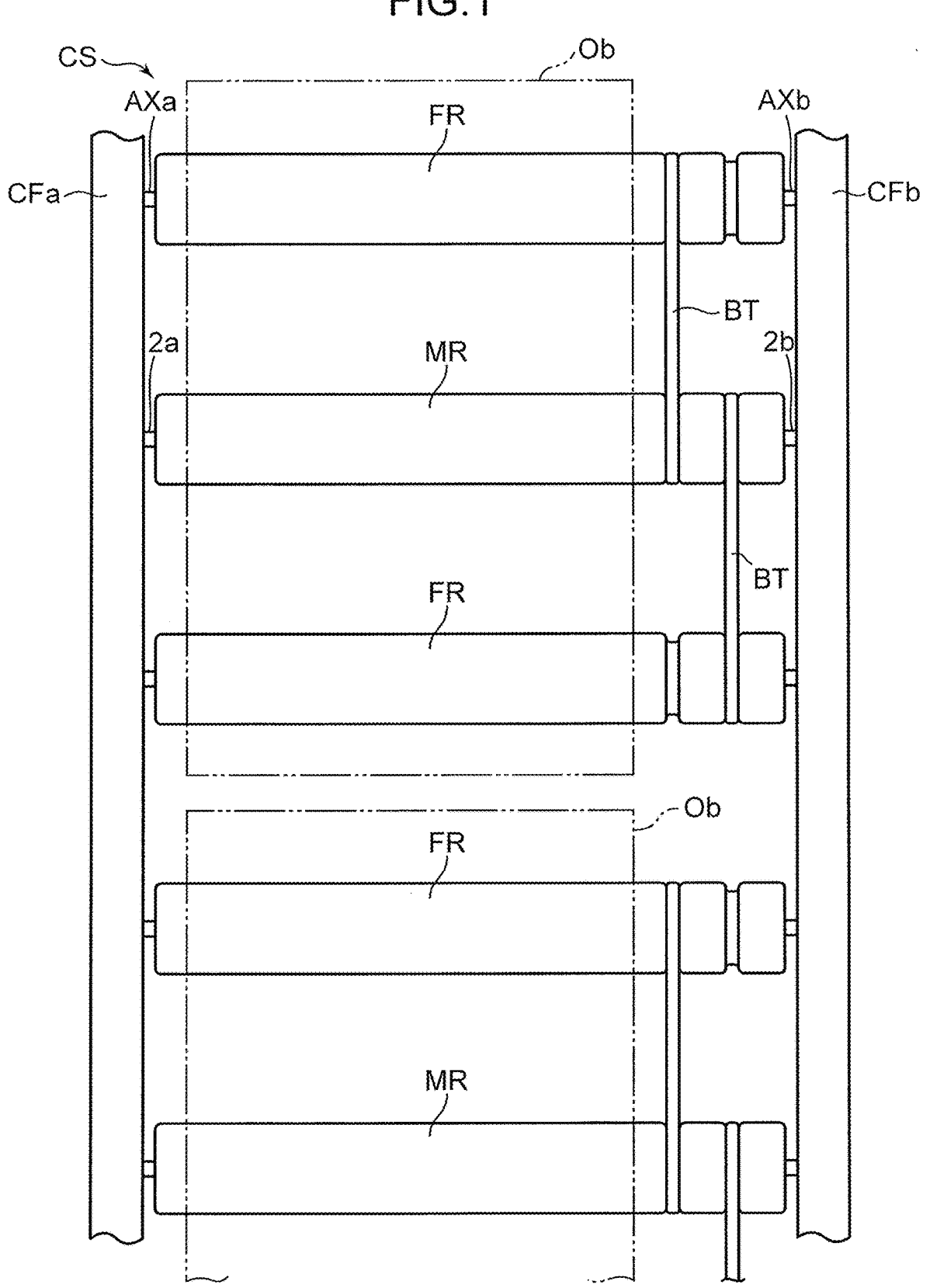
FIG. 1 is a plan view of a conveyor device in an embodiment.

Hereinafter, one or more embodiments of the present invention will be described with reference to the accompanying drawings. However, the present invention should not be limited to the disclosed embodiments. Elements denoted by the same reference numerals in the drawings have the same configuration and, therefore, repeated descriptions will be appropriately omitted. In the present specification, elements are denoted by a same reference numeral when being referred to collectively, and are denoted by a same reference numeral accompanied by a different respective reference character when being referred to individually.

A conveyor device in an embodiment is a roller conveyor device including a plurality of rollers juxtaposed in a direction to transfer a target object or conveyed object on a transfer passage or conveyance passage defined by the rollers, or a belt conveyor device including: a plurality of rollers juxtaposed in a direction; and a conveyance belt resting on the rollers to transfer a target object on a transfer passage defined by the conveyance belt. The rollers in the conveyor device include one or more of the motorized conveyor rollers in the embodiment. The motorized conveyor roller includes: a roller tube; a pair of support shafts located opposite to each other for rotatably supporting the roller tube; a motor located in the roller tube for generating a drive force to rotate the roller tube; a drive circuit located in the roller tube for driving the motor; and a heat conducting part that conducts heat from the drive circuit to one of the pair of support shafts. Hereinafter, the conveyor device and the motorized conveyor roller will be described in further detail with reference to an example roller conveyor device.

Figure 2:
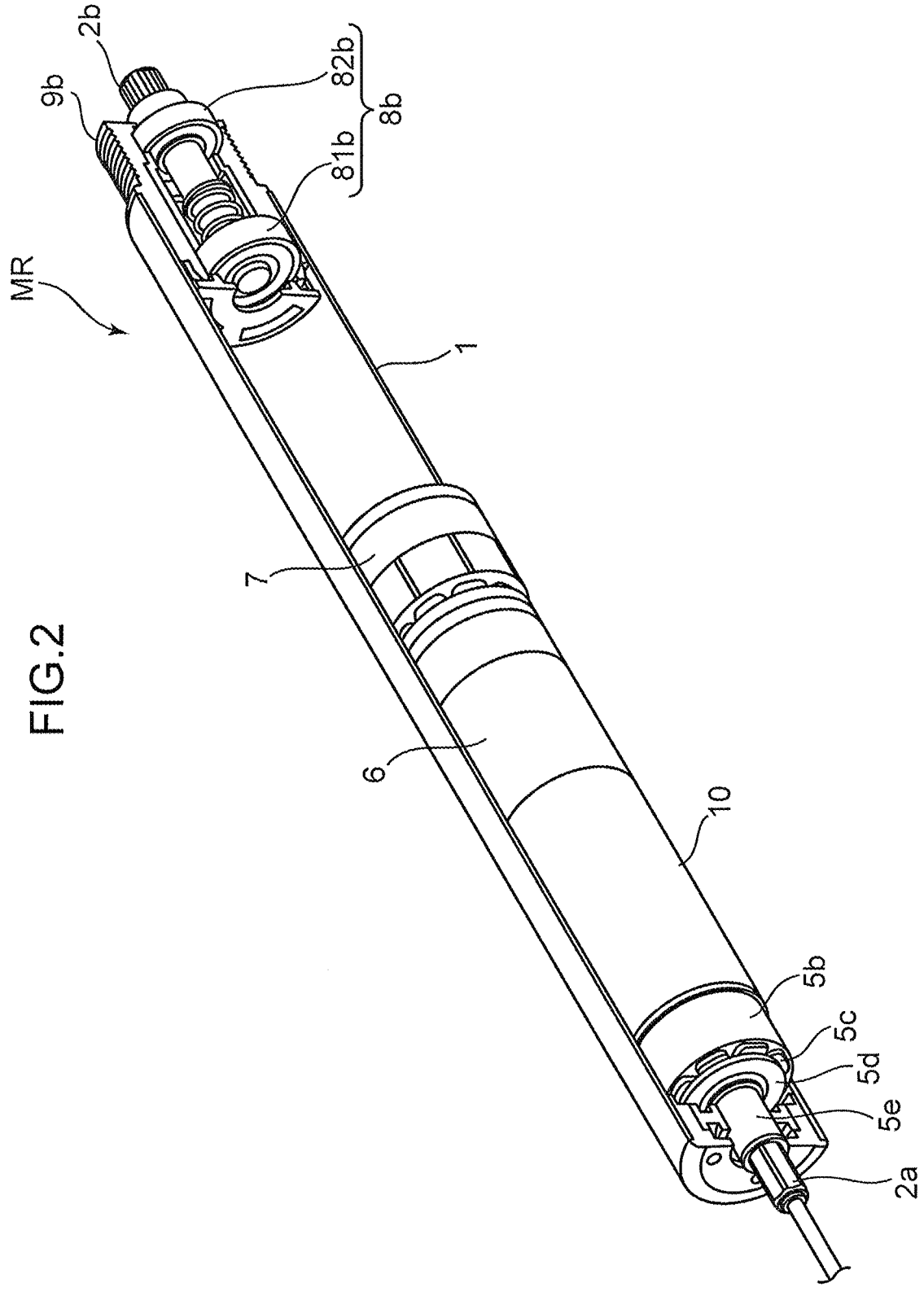
FIG. 2 is a perspective view of an inner configuration of a roller tube of a motorized conveyor roller for use in the conveyor device.
Figure 3:
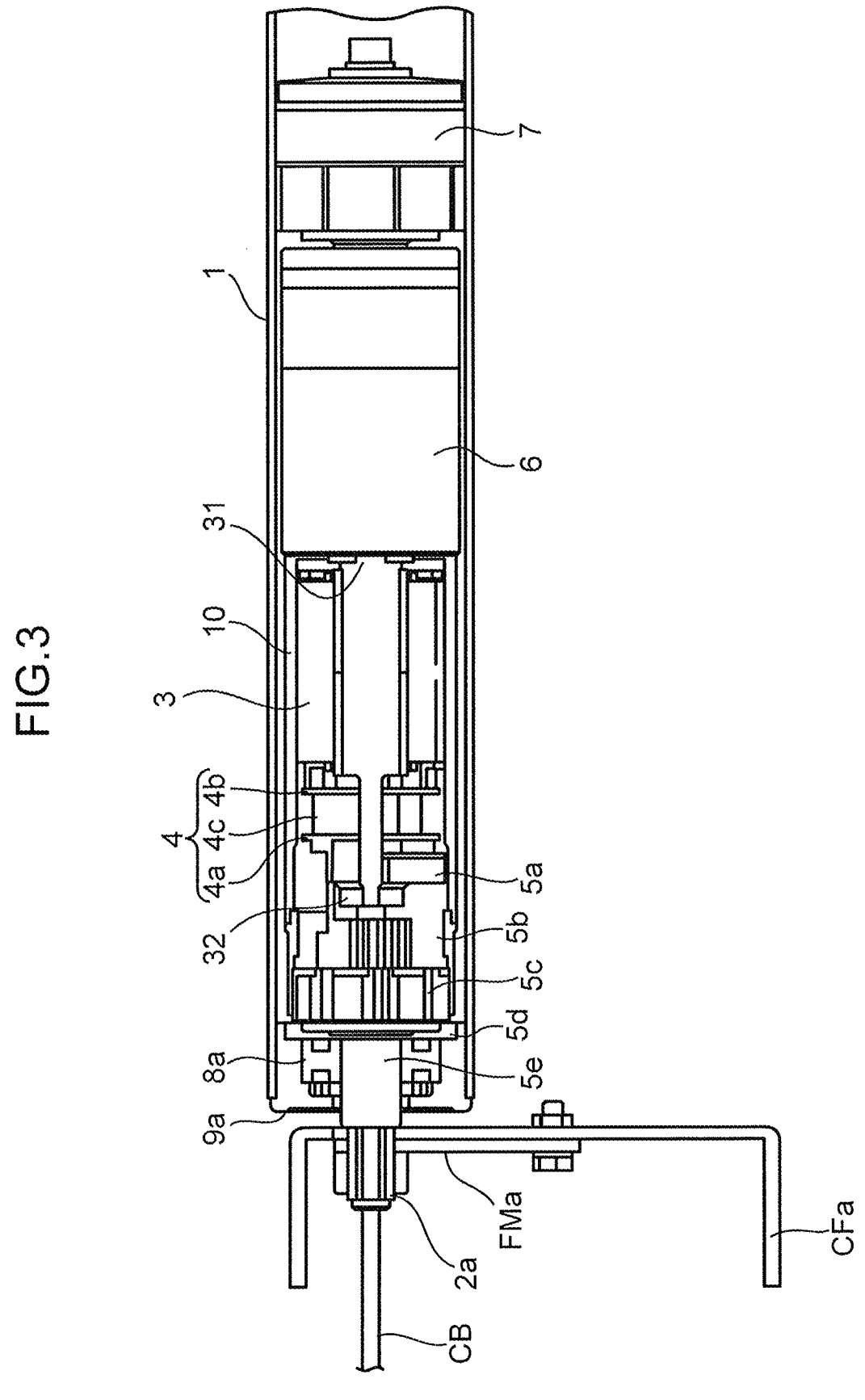
FIG. 3 is a partial cross-sectional view of an inner configuration of the motorized conveyor roller.

FIG. 1 is a plan view of the conveyor device in the embodiment. FIG. 2 is a perspective view of an inner configuration of the roller tube of the motorized conveyor roller for use in the conveyor device. FIG. 3 is a partial cross-sectional view of an inner configuration of the motorized conveyor roller. FIG. 4 includes explanatory views of main components of the motorized conveyor roller. FIG. 4A is an external perspective view of the drive circuit. FIG. 4B is an external perspective view of a heat sink. FIG. 4C is a partially exploded explanatory perspective view of an impact absorber.

As shown in FIG. 1, a conveyor device CS in the embodiment includes, for example, a roller conveyor device CS including a plurality of rollers MR, FR juxtaposed in a direction to transfer a target object or conveyed object Ob on a transfer passage or conveyance passage defined by the rollers MR, FR. FIG. 1 shows the object Ob with a long dashed double-short dashed line.

More specifically, the roller conveyor device CS includes a pair of first and second conveyor frame members CFa, CFb, one or more motorized conveyor rollers MR, one or more driven rollers FR, and one or more belts BT.

Each of the first and second conveyor frame members CFa, CFb is long in one direction of rotatably supporting the motorized conveyor rollers (motorized rollers, hereinafter, each appropriately abbreviated as a "C-M roller") MR and the driven rollers (free rollers) FR, and the frame members face each other at a predetermined distance or first distance in a direction perpendicularly intersecting the one direction and extend in parallel to each other in the one direction. The first distance is suitable for a size of the object Ob to be conveyed by the roller conveyor device CS, and a length of each of the C-M roller MR and the driven roller FR is set depending on the first distance. Each of the first and second conveyor frame members CFa, CFb has, for example, a substantially squared C-shape (corresponding to the shape of the letter "E" excluding the center horizontal line "-") in cross section to increase stiffness, and is preferably made of ferrous metal (including an alloy), e.g., a steel plate cold (SPC) member, having a superior thermal conductivity from the perspective of dissipation of heat conducted through a first support shaft 2a in the C-M roller MR to be described later. Each of the first and second conveyor frame members CFa, CFb has through holes at predetermined distances or second distances in the one direction to receive associated first and second support shafts 2a, 2b of each C-M roller MR therein and receive associated first and second support shafts AXa, AXb of each driven roller FR respectively, the shafts being described later. The first and second support shafts 2a, 2b of the C-M roller MR are inserted in the associated through holes in the first and second conveyor frame members CFa, CFb and fastened to the first and second conveyor frame members CFa, CFb by fasteners FMa, FMb (see FIG. 3, but the fastener FMb is not illustrated) respectively. The first and second support shafts AXa, AXb of the driven roller FR are inserted in, for example, associated through holes in the first and second conveyor frame members CFa, CFb, and fixed to the first and second conveyor frame members CFa, CFb by fitting nuts to screw threads at the first and second support shafts AXa, AXb. Alternatively, for instance, each of the first and second support shaft AXa, AXb may have a hexagon shape, an oval shape (ellipse shape or race track shape), or other shape in cross section to be fit in a through hole having a corresponding hexagon shape, oval shape, or other shape in each of the first and second conveyor frame members CFa, CFb.

The C-M rollers MR are arranged in the one direction by sandwiching two driven rollers FR juxtaposed in the one direction therebetween. Specifically, a predetermined number of C-M rollers MR are arranged respectively in every third rows in the example shown in FIG. 1, and two driven rollers FR are juxtaposed between the two adjacent C-M rollers in the one direction. Therefore, the C-M rollers MR and the driven rollers FR are parallel to each other in the direction perpendicularly intersecting the one direction. Among the C-M rollers and the driven rollers FR, one C-M roller MR is connected to two driven rollers FR being adjacent to each other across the C-M roller in the one direction by the one or more belts BT wound on respective one ends of the rollers. When the one C-M roller MR rotates, the belt BT conveys the rotation of the one C-M roller MR to the two driven rollers FR to rotate the two driven rollers FR. This allows the target object or conveyed object Ob on the C-M rollers MR and the driven rollers FR to be transferred or conveyed.

Such a motorized conveyor roller MR for use in the roller conveyor device CS has, for example, a configuration shown in FIG. 2 to FIG. 4. More specifically, the C-M roller MR includes a roller tube 1 having a cylindrical shape with a predetermined length or first length and made of ferrous metal (including an alloy), e.g., carbon steel for a machine structure. The roller tube 1 has one end to which a first cap member 9a is fixedly attached to close the one end, and another end to which a second cap member 9b is fixedly attached to close another end. The first cap member 9a is provided with a first bearing 8a rotatably supported by the first support shaft 2a therein via a shaft 5e having a cylindrical shape and made of ferrous metal (including an alloy), for example, carbon steel for a machine structure (e.g., S45C). The first cap member 9a has a through hole penetrating the cap along a central axis of the roller tube 1 to receive the first support shaft 2a extending therein via the shaft 5e. Similarly, the second cap member 9b is provided with a second bearing 8b rotatably supported by the second support shaft 2b therein. The second cap member 9b has a through hole penetrating the cap along the central axis to receive the second support shaft 2b extending therein. The first support shaft 2a is a pillar like member made of, for example, ferrous metal (including an alloy) and having a hollow for receiving a cable CB connected to a drive circuit 4 to be described later, and has a periphery having a regular hexagon shape in cross section to be fastened to the first conveyor frame member CFa with the fastener FMa. The shape is not limited to the regular hexagon shape, and may be, for example, an oval shape or a D-shape. In this example, the shaft 5e and the first support shaft 2a are integrally formed, and another portion of the first support shaft 2a that is farther away from a central position of the support shaft 2a to another side serves as the shaft 5e. The second support shaft 2b is a columnar member, and the second bearing 8b includes two bearing sections of the second A bearing section 81b and the second B bearing section 82b to support the second support shaft 2b at two positions.

In this configuration, the roller tube 1 is rotatably supported by the first and second support shafts 2a, 2b respectively protruding from the first and second conveyor frame members CFa, CFb.

The C-M roller MR includes a motor 3 located in the roller tube 1. More specifically, the motor 3 is accommodated in an inner frame 10 made of metal (including an alloy), e.g., aluminum, and having a cylindrical shape with a predetermined length or second length and a diameter smaller than the diameter of the roller tube 1. The inner frame 10 is accommodated in the roller tube 1 with a gap from an inner surface of the roller tube 1 in such a manner that the roller tube 1 is rotatable about the inner frame 10.

The inner frame 10 has another portion at another position for fixedly accommodating a speed reducer 6 formed of a planetary gear or other gear in the inner frame 10. The speed reducer 6 has an output shaft fixedly coupled to an intermediate plate 7 having a columnar shape, and the intermediate plate 7 has an outer surface to be fixedly connected to the inner surface of the roller tube 1. The motor 3 fixedly accommodated in the inner frame 10 is arranged on one side of the speed reducer 6. The motor 3 has an output shaft 31 coupled to an input part of the speed reducer 6. In this configuration, rotation of the output shaft 31 of the motor 3 makes the intermediate plate 7 rotate via the speed reducer 6, and the rotation of the intermediate plate 7 makes the roller tube 1 rotate. As described above, the motor 3 is located in the roller tube 1 via the inner frame 10 and generates a drive force to rotate the roller tube 1. The motor 3 may be a motor of any appropriate type. In the example shown in FIG. 2 to FIG. 4, the motor is a motor of an inner rotor type with a radial gap, and includes: a rotor having a plurality of permanent magnets; and a stator having a plurality of coils. The coils become electrically conductive and generate a rotation magnetic field that interacts with a magnetic field of each permanent magnet, so that the rotor rotates and the output shaft 31 rotates.

The inner frame 10 has one end to which a motor bracket 5*b* made of metal (including an alloy), e.g., aluminum, is fixedly attached to close the one end. The motor bracket 5*b* is provided with a third bearing 32 that rotatably supports the output shaft 31 of the motor 3.

The drive circuit (control circuit) 4 and a heat sink 5*a* are connectively arranged between the motor 3 and the motor bracket 5*b*. That is to say, the inner frame 10 accommodates the drive circuit 4 and the heat sink 5*a*. The drive circuit 4 drives the motor 3 to, for example, supply electric power to the motor 3, start the motor 3, increase a speed thereof, maintain the speed, reduce the speed, stop or suspend the motor, and to give a clockwise rotation CW or a counterclockwise rotation CCW in accordance with a control signal. The electric power to be supplied to the motor 3 is supplied from an outside through a power source line in the cable CB, and the control signal is input from the outside via a signal line in the cable CB. As shown in FIG. 4B, the drive circuit 4 includes, for example, a base member 4*c* having a columnar shape, and first and second substrates 4*a*, 4*b* arranged on the opposite end surfaces of the base member 4*c* respectively. Each of the first substrate 4*a*, the base member 4*c*, and the second substrate 4*b* has a through hole penetrating along the central axis for receiving a portion of the output shaft 31 extending to the third bearing 32, i.e., a portion of the output shaft 31 extending oppositely to the portion of the output shaft 31 extending to the speed reducer 6. Each of the first and second substrates 4*a*, 4*b* bears thereon a plurality of elements constituting the drive circuit 4, e.g., a microprocessor, a metal oxide semiconductor field effect transistor (MOSFET), and other elements. The base member 4*c* is fixed in the inner frame 10. The drive circuit 4 having this configuration is disclosed in, for example, Patent Literature 1 and Patent Literature 2. The heat sink 5*a* is arranged to be in direct contact with one or more of the elements constituting the drive circuit 4. As shown in FIG. 4B, for example, the heat sink Sa includes: a base part 51 having a semiannular shape; and a plurality of fins 52 having a plate shape and standing on a surface of the base part 51 at a predetermined distance or third distance in a circumferential direction thereof. The base part 51 has another surface which is in direct contact with one or more of the elements constituting the drive circuit 4, and each of the fins 52 has an upper surface which is in contact with the motor bracket 5*b*.

The motor bracket 5*b* closing one end of the inner frame 10 and fixedly attached thereto is fixedly coupled to the shaft 5*e* by a coupling hub 5*d* via an impact absorber 5*c*. The impact absorber 5*c* is a member that absorbs an impact which occurs in at least one of a start and a stop of the motor 3, and has a thermal conductivity superior to, for example, rubber, in the embodiment. The impact absorber 5*c* is made of, for example, rubber containing graphite, e.g., urethane rubber, or nitril rubber such as nitril-butadiene rubber (NBR). For instance, a typical producing way is adopted to produce nitril rubber containing graphite by mixing graphite produced by Fuji Graphite Works Co., Ltd. with an average grain size of 180 [µm] into middle-high nitril rubber produced by Nippon Zeon Polymer Cooperation (Zeon Corporation) with the product name CM-580H at a ratio of 50 of the graphite to 100 of the nitril rubber with a content proportion of 33 mass [%]. The nitril rubber containing the graphite in this manner has a thermal conductivity rate of 0.45 [W/(m·K)] while nitril rubber alone has a thermal conductivity rate of 0.25 [W/(m·K)]. It is seen from this perspective that the impact absorber 5*c* can absorb an impact and more effectively conduct heat. For instance, the impact absorber 5*c* has a cylindrical shape with alternate protrusions and recesses in a circumferential direction as shown in FIG. 4C. The motor bracket 5*b* has one end having such a shape in inner cross section as an inverse of the shape of the impact absorber 5*c* in outer cross section so that the impact absorber 5*c* fits in the one end of the motor bracket 5*b*. The coupling hub 5*d* is a member having a substantially columnar shape and made of, for example, sintered alloy. The coupling hub 5*d* has such a shape in outer cross section in as inverse of an the shape of the impact absorber 5*c* in inner cross section so that the coupling hub 5*d* fits in the impact absorber 5*c*. The coupling hub 5*d* has a through hole penetrating along the central axis and having, for example, an oval shape in cross section.

The shaft 5*e* has one portion extending in one direction from a substantially central position thereof and having a circular shape in outer cross section to be rotatably supported by the first bearing 8*a*, and another portion extending in another direction from the substantially central position and having, for example, an oval shape in outer cross section to be fixedly coupled to the coupling hub 5*d*. Fitting of another portion of the shaft 5*e* into the through hole of the coupling hub 5*d* results in fixedly coupling the shaft 5*e* and the coupling hub 5*d* to each other.

In this configuration, the motor 3 is fixed to the first conveyor frame member CFa via the inner frame 10, the motor bracket 5*b*, the impact absorber 5*c*, the coupling hub 5*d*, the shaft 5*e*, and the first support shaft 2*a*. When the motor 3 rotates, the roller tube 1 rotates.

When the motor 3 is driven, heat is generated in coils of the motor 3 and in the drive circuit 4. The heat is conducted to the first conveyor frame member CFa via the heat sink 5*a*, the motor bracket 5*b*, the impact absorber 5*c*, the coupling hub 5*d*, the shaft 5*e*, and the first support shaft 2*a* to be dissipated. Hence, the drive circuit 4, the heat sink 5*a*, the motor bracket 5*b*, the impact absorber 5*c*, the coupling hub 5*d*, the shaft 5*e*, the first support shaft 2*a*, and the first conveyor frame member CFa may be preferably in contact with each other between the two adjacent elements, more preferably in close contact with each other without any gap between the two adjacent elements. Even in an existence of a gap or gaps, these elements each made of material having a superior thermal conductivity sequentially conduct the heat generated in the coils of the motor 3 and in the drive circuit 4 to be dissipated to the outside.

The heat sink 5*a*, the motor bracket 5*b*, the impact absorber 5*c*, the coupling hub 5*d*, and the shaft 5*e* serve as an example of a heating part that conducts the heat from the drive circuit to one of the pair of support shafts.

Figure 5A:
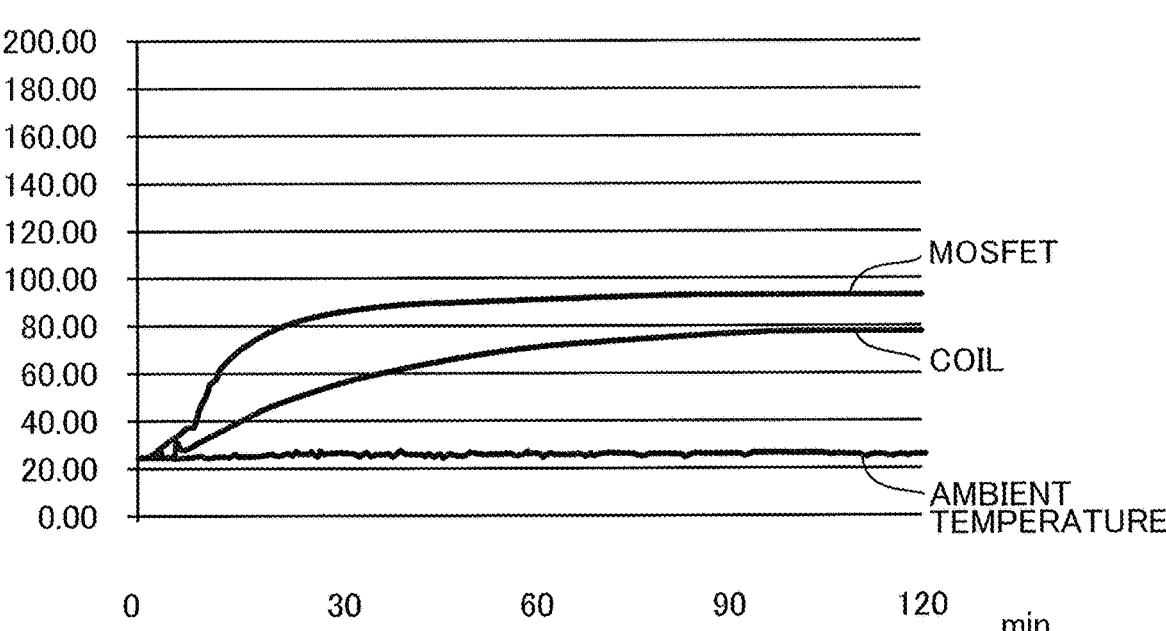
FIG. 5 includes graphs for explaining a temperature increase reduction effect in the motorized conveyor roller.
Figure 5B:
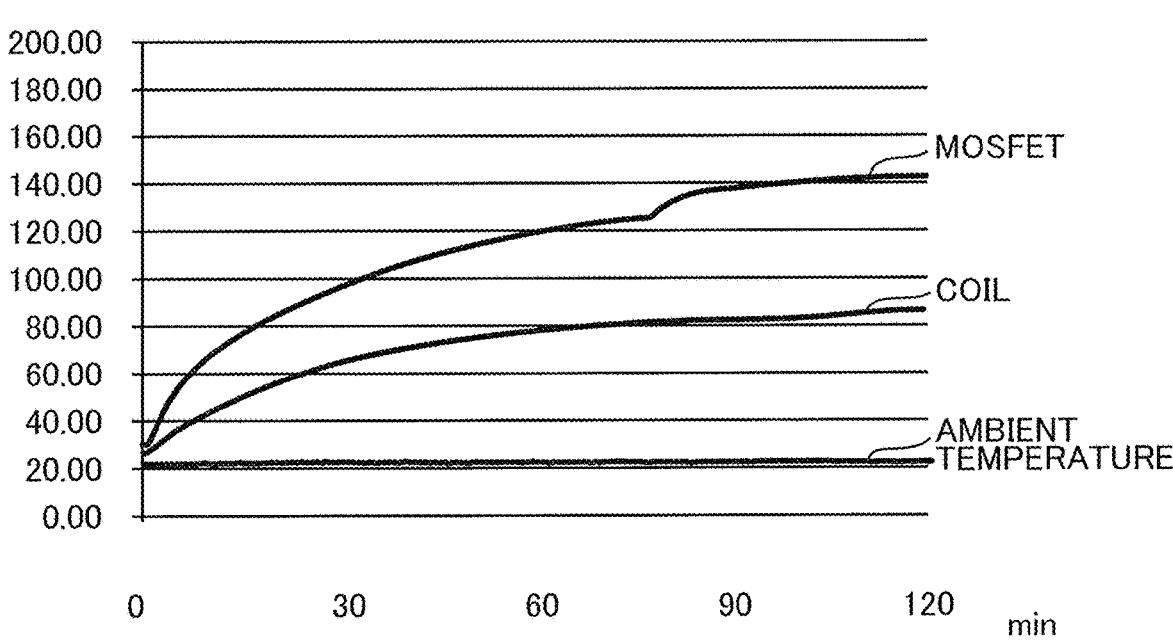

FIG. 5 and Table 1 show an example of an effect of reducing a temperature increase. FIG. 5 includes graphs for explaining a temperature increase reduction effect in the motorized conveyor roller. In FIG. 5, a horizontal axis denotes an elapsed time and a vertical axis denotes a temperature [° C.]. FIG. 5A shows a temperature change in each of the MOSFET, the coils, and an ambience therearound in presence of the heat sink 5a. FIG. 5B shows a temperature change in each of the MOSFET, the coils, and an ambience therearound in absence of the heat sink 5a. In the example shown in FIG. 5, an impact absorber is made of rubber (e.g., urethane rubber or nitril rubber) without containing graphite. It is understood from comparison between each temperature change seen in FIG. 5A and each temperature change seen in FIG. 5B that the temperature of the MOSFET rises to reach around 141.5 [° C.] with respect to an ambient temperature of around 20.66 [° C.] (with a temperature rise of 120.84 [° C.]) in absence of the heat sink 5a, but the temperature of the MOSFET only rises to reach around 93.38 [° C.] with respect to the ambient temperature of around 20.32 [° C.] (with a temperature rise of 73.06 [° C.]) in presence of the heat sink 5a. Thus, using the heat sink 5a results in reducing the increase in the temperature of the MOSFET. A microprocessor for use in the drive circuit 4 is normally set to activate a protective function at 105 [° C.], but the example shown in FIG. 5 is expected to avoid the activation of the protective function. The temperature of the coils rises to reach around 85.1 [° C.] with respect to the ambient temperature of around 20.66[° C.] (with a temperature rise of 64.44 [° C.]) in absence of the heat sink 5a, while the temperature of the coils only rises to reach around 79.8 [° C.] with respect to the ambient temperature of around 20.32 [° C.] (with a temperature rise of 59.48 [° C.]) in presence of the heat sink 5a.

Further, as seen from Table 1, although the temperature of the roller tube 1 rises to reach around 76.3 [° C.] in use of an impact absorber containing no graphite, the temperature of the roller tube 1 only rises to reach around 73.1 [° C.] in use of an impact absorber containing graphite, and thus, a temperature increase is reduced.

TABLE 1

| Material quality | Inner frame 10 | Motor bracket 5b | Impact absorber 5c | Coupling hub 52 | Shaft 51 | Roller tube 1 |
|---|---|---|---|---|---|---|
| Standard (without graphite) | 105 | 105 | 80 | 70 | 65 | 76.3 |
| With graphite | 100 | 95 | 95 | 90 | 80 | 73.1 |
| Difference | 5 | 10 | −15 | −20 | −15 | 3.2 |

Although the heat conducting part is configured to include the heat sink 5a, the motor bracket 5b, the impact absorber 5c, the coupling hub 5d, and the shaft 5e in the example, the heat conducting part is not limited to this example and may have another configuration. For instance, a communication passage extending from the outside to the drive circuit 4 to receive the cable CB extending therein may have a two-layered structure made of heat insulator with one layer for the cable CB extending therethrough and another layer for a heat pipe extending therethrough to conduct the heat generated in the drive circuit 4 to the first support shaft 2a.

As described heretofore, the motorized conveyor roller MR in the embodiment achieves a reduction in the temperature rise owing to the dissipation of the heat generated in the drive circuit 4 from the first support shaft 2a to the outside.

The motorized conveyor roller MR including the heat sink 5a allows the heat sink 5a to dissipate the heat from the drive circuit 4, and thus attains a reduction in a temperature increase in each element constituting the drive circuit 4. In a case of indirect contact via a heat conducting sheet 5f, the heat conducting sheet 5f achieves an improvement in close contact between the one or more elements constituting the drive circuit 4 and the heat sink 5a. This succeeds in more reliably conducting the heat from the drive circuit 4 to the heat sink 5a.

Even the motorized conveyor roller MR including the impact absorber in the passage for conducting heat can more reliably conduct the heat from the drive circuit 4 to a support shaft owing to the thermal conductivity of the impact absorber 5c superior to that of rubber.

The motorized conveyor roller MR including the impact absorber 5c made of rubber containing graphite can absorb an impact and more effectively conduct the heat.

The embodiment can provide a conveyor device CS which includes a roller conveyor device including one or more of the motorized conveyor rollers MR. The conveyor device CS having this configuration attains a reduction in a temperature increase in the motorized conveyor roller.

Although the heat sink 5a constituting a part of the heat conducting part is in direct contact with one or more elements constituting the drive circuit 4 in the embodiment, the heat sink 5a may be in contact with the one or more elements via the heat conducting sheet 5f in a first modified embodiment. In this example, the heat conducting sheet 5f is provided in the heat conducting part.

Figure 6:
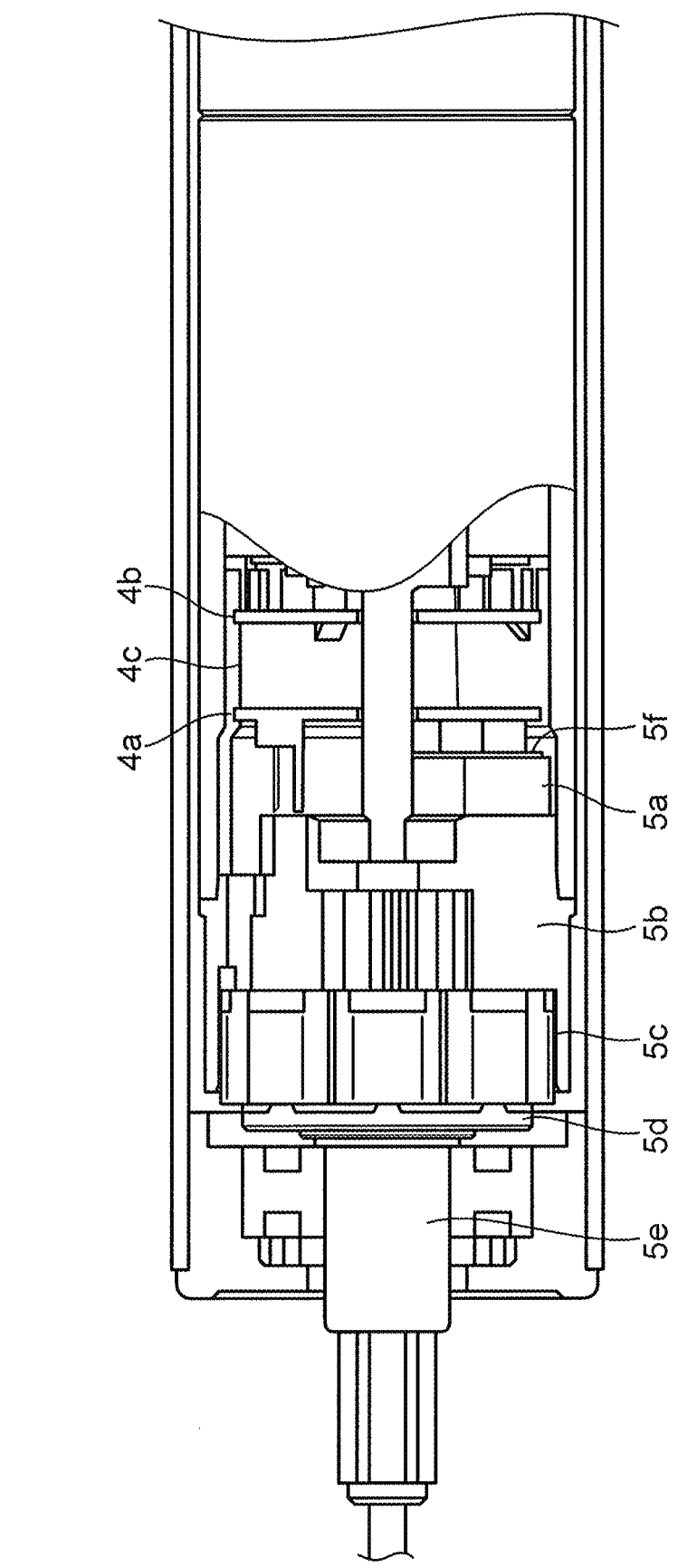
FIG. 6 is a partial cross-sectional view of an inner configuration of a motorized conveyor roller in a first modified embodiment.

FIG. 6 is a partial cross-sectional view of an inner configuration of a motorized conveyor roller in the first modified embodiment. For instance, as shown in FIG. 6, a heat sink 5a is arranged to be in contact with one or more elements constituting a drive circuit 4 via the heat conducting sheet 5f made of, for example, silicone containing metallic fillers and having thermal conductivity in a sheet shape. In this case, a heat conducting sheet 5f can improve close contact between the one or more elements constituting the drive circuit 4 and the heat sink 5a, and more reliably conduct heat from the drive circuit 4 to the heat sink 5a.

As described heretofore, the motorized conveyor roller MR in the embodiment may be used in a conveyor device which includes a belt conveyor device in a second modified embodiment.

Figure 7:
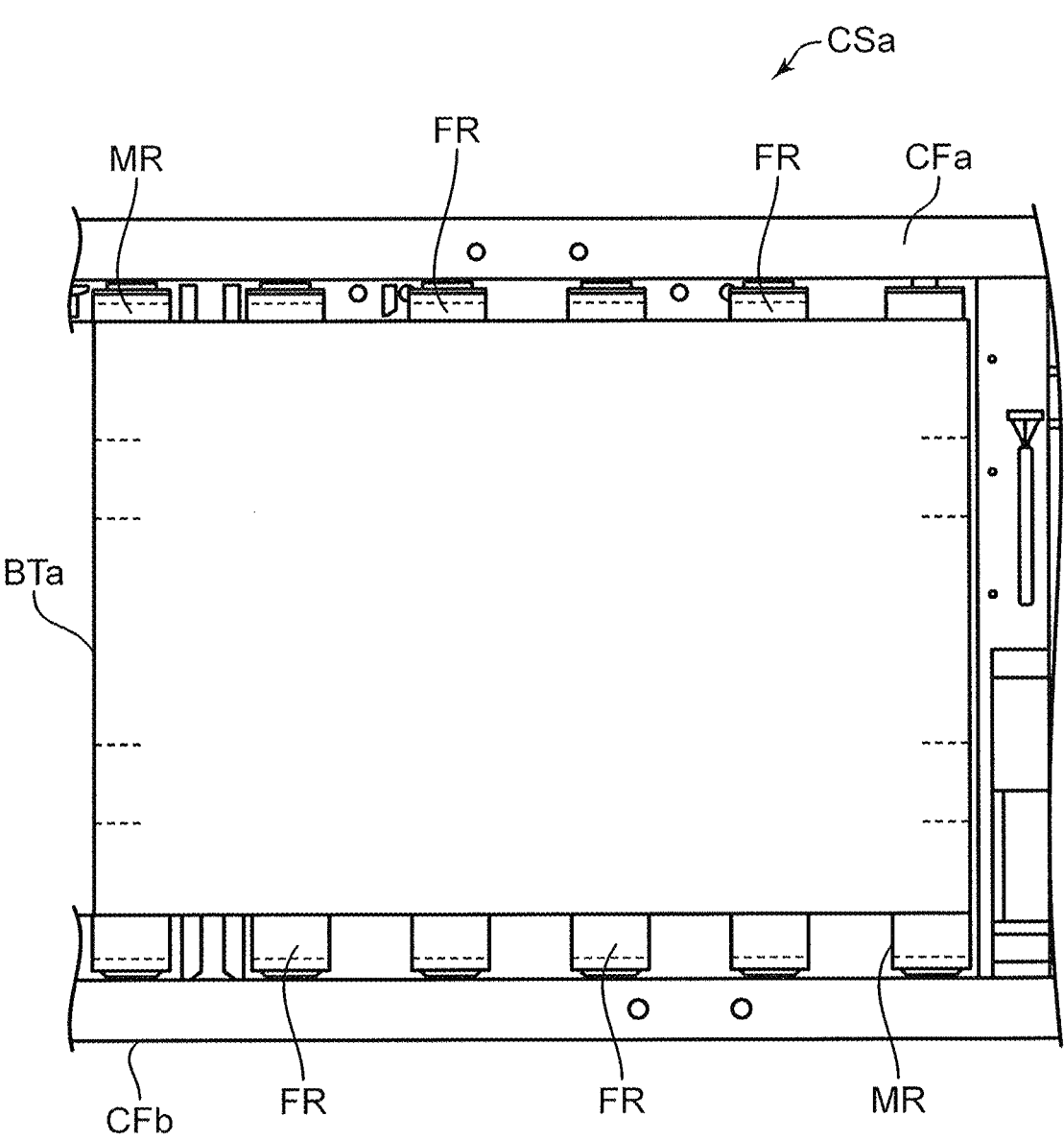
FIG. 7 is a plan view of a conveyor device in a second modified embodiment.

FIG. 7 is a plan view of a conveyor device in the second modified embodiment. As shown in FIG. 7, a conveyor device CSa in the second modified embodiment includes a belt conveyor device including, for example, a plurality of rollers MR, FR juxtaposed in a direction, and a conveyance belt BTa resting on the rollers MR, FR to transfer a target object on a transfer passage defined by the conveyance belt BTa. More specifically, the conveyor device CSa includes a pair of first and second conveyor frame members CFa, CFb, one or more motorized conveyor rollers MR, one or more driven rollers FR, and the conveyance belt BTa. The first and second conveyor frame members CFa, CFb, the motorized conveyor rollers MR, and the driven rollers FR are respectively same as the first and second conveyor frame members CFa, CFb, the motorized conveyor rollers MR, and the driven rollers FR in the preceding embodiment, and thus, the descriptions therefor are omitted.

In this regard, the conveyor device CS in the preceding embodiment includes the C-M rollers MR arranged in every third rows, and the belt BT having a ring or annular shape to connect one end of a C-M roller MR and one end of a driven roller FR adjacent thereto to each other. In comparison with this, in the conveyor device CSa in the second modified embodiment, the rollers located at the opposite positions among the rollers MR, FR juxtaposed in the direction are defined as the C-M rollers MR, and the conveyance belt BTa having a large width rests thereon. One or more of the driven rollers FR juxtaposed between the C-M rollers MR at the opposite positions may be replaced with corresponding one or more C-M rollers MR.

The embodiment can provide the conveyor device CSa which includes a belt conveyor device including one or more of the motorized conveyor rollers MR. The conveyor device CSa attains a reduction in a temperature increase in the motorized conveyor roller MR.

Various aspects of technologies are disclosed in this specification as described above. Main technologies among them will be summarized below.

A motorized conveyor roller according to an aspect includes: a roller tube: a pair of support shafts located opposite to each other for rotatably supporting the roller tube; a motor located in the roller tube for generating a drive force to rotate the roller tube; a drive circuit located in the roller tube for driving the motor; and a heat conducting part that conducts heat from the drive circuit to one of the pair of support shafts.

The motorized conveyor roller including the heat conducting part that conducts the heat from the drive circuit to one of the pair of the support shafts can dissipate the heat generated in the drive circuit to an outside, and thus attains a reduction in a temperature increase.

In another aspect, in the motorized conveyor roller, the heat conducting part includes a heat sink that is in direct contact with one or more elements constituting the drive circuit, or in contact with the one or more elements via a heat conducting sheet.

The motorized conveyor roller including the heat sink that is in direct or indirect contact with the one or more elements constituting the drive circuit allows the heat sink to dissipate the heat generated in the drive circuit, and thus attains a reduction in the temperature increase in each element constituting the drive circuit. In a case of indirect contact via the heat conducting sheet, the heat conducting sheet achieves an improvement in close contact between the one or more elements constituting the drive circuit and the heat sink. This succeeds in more reliably conducting the heat from the drive circuit to the heat sink.

In another aspect, the motorized conveyor roller further includes an impact absorber that absorbs an impact which occurs in at least one of a start and a stop of the motor, the impact absorber being provided in the heat conducting part and having a thermal conductivity.

Even the motorized conveyor roller including the impact absorber provided in the heat conducting part can more reliably conduct the heat from the drive circuit to the support shaft owing to the thermal conductivity of the impact absorber.

In another aspect, in the motorized conveyor roller, the impact absorber is made of rubber containing graphite.

The motorized conveyor roller including the impact absorber made of rubber containing graphite can absorb an impact, and more effectively conduct the heat.

A conveyor device according to another aspect includes a roller conveyor device including a plurality of rollers juxtaposed in a direction for transferring a target object on a conveying passage defined by the rollers, the rollers including one or more of the motorized conveyor rollers.

This succeeds in providing a conveyor device which includes a roller conveyor device including one or more of the motorized conveyor rollers. The conveyor device attains a reduction in a temperature increase in the motorized conveyor roller.

A conveyor device according to another aspect includes a belt conveyor device including a plurality of rollers juxtaposed in a direction and a conveyance belt resting on the rollers to transfer a target object on a transfer passage defined by the conveyance belt, the rollers including one or more of the motorized conveyor rollers.

This succeeds in providing a conveyor device which includes a belt conveyor device including one or more of the motorized conveyor rollers. The conveyor device attains a reduction in a temperature increase in the motorized conveyor roller.

This application is based on Japanese Patent Application No. 2022-170747 filed in Japan Patent Office on Oct. 25, 2022, and includes contents thereof.

Although the present invention has been fully described by way of the embodiments and examples with reference to the above-described specific examples, it is to be understood that various changes and/or modifications to the embodiments and examples will be apparent to those skilled in the art. Therefore, unless otherwise such changes and modifications to be made by those skilled in the art depart from the scope of the present invention hereinafter defined, they should be construed as being included therein.

INDUSTRIAL APPLICABILITY

The present invention can provide a motorized conveyor roller for use in a conveyor device, and a conveyor device using the motorized conveyor roller.

The invention claimed is:

1. A motorized conveyor roller, comprising:
a roller tube;
a pair of support shafts located opposite to each other for rotatably supporting the roller tube;
a motor located in the roller tube for generating a drive force to rotate the roller tube;
a drive circuit located in the roller tube for driving the motor;
a heat conducting part that conducts heat from the drive circuit to one of the pair of support shafts; and
an impact absorber that absorbs an impact which occurs in at least one of a start and a stop of the motor,
the impact absorber being provided in the heat conducting part and having a thermal conductivity.

2. The motorized conveyor roller according to claim 1, wherein the heat conducting part includes a heatsink that is in direct contact with one or more elements constituting the drive circuit.

3. The motorized conveyor roller according to claim 1, wherein the impact absorber is made of rubber containing graphite.

4. A conveyor device, comprising:
a roller conveyor device including a plurality of rollers juxtaposed in a direction to transfer a target object on a transfer passage defined by the rollers,
the rollers including one or more of the motorized conveyor rollers according to claim 1.

5. A conveyor device, comprising:
a belt conveyor device including a plurality of rollers juxtaposed in a direction and a conveyance belt resting on the rollers to transfer a target object on a transfer passage defined by the conveyance belt, the rollers including one or more of the motorized conveyor rollers according to claim 1.

6. The motorized conveyor roller according to claim 1, wherein the heat conducting part includes a heatsink that is in contact with one or more elements via a heat conducting sheet.

7. A conveyor device, comprising:

a roller conveyor device including a plurality of rollers juxtaposed in a direction to transfer a target object on a transfer passage defined by the rollers, the rollers including one or more of the motorized conveyor rollers according to claim 2.

8. A conveyor device, comprising:

a roller conveyor device including a plurality of rollers juxtaposed in a direction to transfer a target object on a transfer passage defined by the rollers, the rollers including one or more of the motorized conveyor rollers according to claim 3.

9. A conveyor device, comprising:

a belt conveyor device including a plurality of rollers juxtaposed in a direction and a conveyance belt resting on the rollers to transfer a target object on a transfer passage defined by the conveyance belt, the rollers including one or more of the motorized conveyor rollers according to claim 2.

10. A conveyor device, comprising:

a belt conveyor device including a plurality of rollers juxtaposed in a direction and a conveyance belt resting on the rollers to transfer a target object on a transfer passage defined by the conveyance belt, the rollers including one or more of the motorized conveyor rollers according to claim 3.

* * * * *